Oct. 11, 1966   R. J. CUNNINGHAM   3,278,861
BLOCKING OSCILLATOR WITH TRANSISTOR RATE CONTROL
Filed May 4, 1964
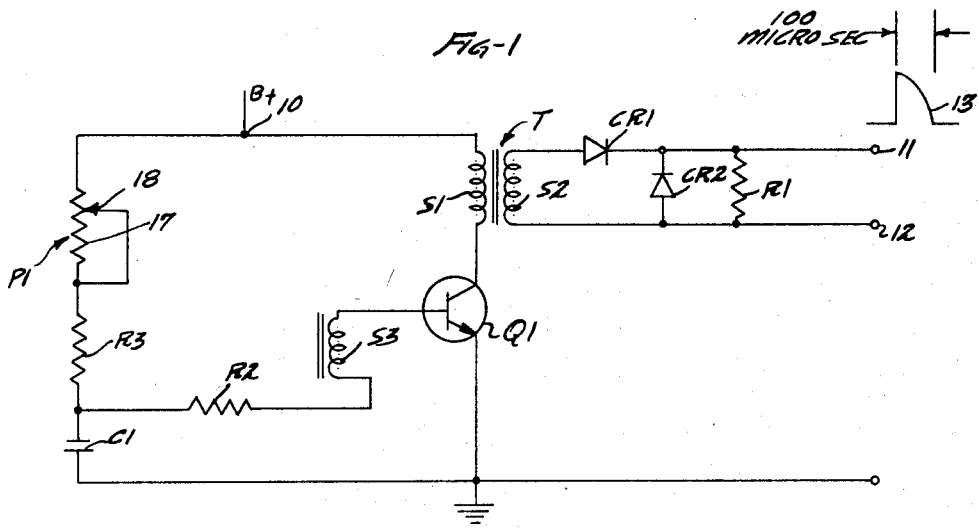
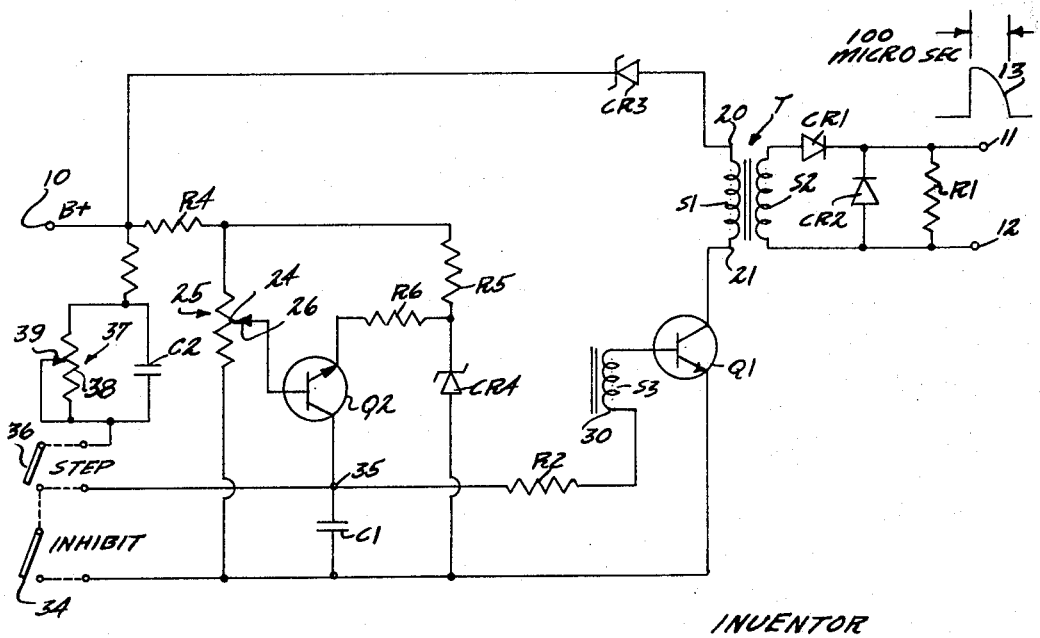
INVENTOR
RONALD J. CUNNINGHAM
BY Herzig & Walsh
ATTORNEYS

United States Patent Office 3,278,861
Patented Oct. 11, 1966

3,278,861
BLOCKING OSCILLATOR WITH TRANSISTOR RATE CONTROL
Ronald James Cunningham, 2445 Riverside Drive, Los Angeles, Calif.
Filed May 4, 1964, Ser. No. 364,552
4 Claims. (Cl. 331—112)

This invention relates to improved pulse sources adaptable for use in various ways in connection with electronic equipment. The pulse sources of this invention are particularly adapted for use with the pulsing or stepping operation of stepper motors which have wide application and utilization in many types of equipment and apparatus. These pulse sources may be used with stepper motor controllers such as shown in the application of Ronald James Cunningham, Serial No. 338,833, filed January 20, 1964, or Serial No. 431,372, filed Feb. 9, 1965. They may be used also in many other ways.

The primary object of the invention is to provide an improved pulse source or pulse sources which are simplified, positive in action and dependable, but which additionally, in preferred forms of the invention, have particular characteristics highly adapted to the applications for which the pulse sources are more particularly intended. In a preferred form of the invention, the pulse source may be one providing a pulse output rate which can be easily and accurately varied from one to one thousand pulses per second, for example. Also, in a preferred form of the invention the amplitude of the output pulses is equal to the amplitude of the input voltage to the pulse source. Further, the output pulses in an exemplary preferred form of the invention have a fixed duration of 100 microseconds. It is an object of the invention to provide improved means for providing outputs having these characteristics, although the invention is not limited to these specific characteristics in the output.

Further objects and advantages of the invention will become apparent from the following detailed description and annexed drawings wherein:

FIGURE 1 is a schematic wiring diagram of one form of the invention.

FIGURE 2 is a schematic circuit diagram of a preferred form of the invention.

FIGURE 1 of the drawings shows one form of the invention although the form shown in FIGURE 2 is the preferred form. The pulse source shown in FIGURE 1 is a blocking oscillator circuit. The power supply for this circuit is the B+ power supply connected to the terminal 10. This supply is connected to the primary winding S1 of a transformer T having a secondary winding S2 and another secondary winding S3. The secondary winding S2 is the output connecting to the output circuit having terminals 11 and 12 across which the pulses appear. The pulses may have a shape as shown at 13 having an amplitude equal to the amplitude of the B+ supply and each pulse having a duration of 100 microseconds, for example. Across the output circuit is a resistor R1 and diodes CR1 and CR2 whereby the pulses are half wave.

The primary winding S1 connects to the collector of transistor Q1, the emitter of this transistor being connected to ground. The secondary winding S3 of transformer T is connected to the base of transistor Q1 through a resistor R2. Connected across the primary winding S1 of transformer T and the secondary winding S3 is a potentiometer P1 including a slide wire resistor 17 and a sliding contact or slider 18. The potentiometer is in series with a resistor R3. Capacitor C1 is connected to the emitter of the transistor Q1 across the secondary winding S3 and resistor R2.

The operation of the pulse source is as follows, starting at a time in the cycle when the secondary winding S3 has discharged and has charged the capacitor C1 to thereby turn off the transistor Q1. When the capacitor or condenser C1 is charged, it holds the transistor Q1 in the "off" condition. When current is fed to the primary of the transformer T, the field builds up aiding itself until saturation of the core is reached and the field collapses. The collapsing field leaves the capacitor C1 charged which keeps the transistor Q1 biased in the "off" condition until the capacitor C1 discharges back through the supply and the transistor Q1 again begins to conduct. Transistor Q1 is biased off as long as the condenser C1 is charged with its negative side connected to the transistor base. When the charge has leaked off the condenser C1 sufficiently for the transistor to conduct, it begins to conduct again and the current again flows through the primary S1 of the transformer T until saturation is again reached and the field breaks down. When it breaks down it produces an induced pulse in the secondary S2 which is the pulse shown at 13 and it produces a pulse in the secondary S3 which recharges the condenser C1. At the time the field collapses it leaves the condenser C1 charged. When the field is building up in the primary S1 of transformer T, voltage is being induced in the secondary S3 which seeks to reinforce the ability of the transistor to conduct, the secondary winding S3 being connected to the base of the transistor.

As may be seen, therefore, the output pulses are induced in the secondary winding S2. The effect of the other secondary winding S3 is to cause the transformer to seek to hold the voltage; it tries to hold a constant current and this is a characteristic that determines the width of the output pulse. As may be observed, the circuit of the pulse source is a blocking oscillator circuit which has the particular characteristics as explained which have utility as set forth in the foregoing. This source as described provides pulses of exact shape, or exact width and amplitude which are therefore appropriate for driving an electrical controller of the type shown in the prior application referred to which is used to operate a stepper motor.

FIGURE 2 of the drawings shows a modified form of the invention which is the preferred form of the invention. Parts of the circuit in this figure, which are the same as and correspond to similar parts in FIGURE 1, are identified by the same reference character and will not be described in detail again.

This form of the invention embodies certain features or characteristics which add to its adaptability and further make possible certain additional functions and performance characteristics. In this form of the invention as second transistor Q2 is used rather than the potentiometer P1 of FIGURE 1. Using the transistor as described hereinafter, more sensitive control of the pulsing rate can be realized. Also, the potentiometer has a non-linear charge and discharge rate whereas that is not true of the transistor.

In the form of the invention shown in FIGURE 2, means are provided for terminating the pulsing of the circuit and this may be from a remote point, doing this with fidelity or integrity, that is without gaining or losing a pulse. Additionally, means are provided for manually causing the circuit to transmit pulses individually and this too may be from a remote point, or causing the generator to produce pulses at a different relatively low predetermined rate or on the other hand, to produce a predetermined number of pulses in this way at the low rate. This arrangement has the advantage that when the generator is used to control stepper motors, a single pulse or a predetermined number of pulses may be inserted manually in order to bring the stepper motor back to a desired fixed position from one side or the other of such position.

Referring to FIGURE 2 of the drawings, the B+ terminal 10 is connected through zener diode CR3 to the primary S1 of the transformer T. The diode CR3 holds the voltage at 10 volts. A positive potential of ten volts is supplied to the terminal 20 of transformer T which is coupled to the transformer terminal 21 and to the collector of transistor Q1.

The B+ voltage is also connected through resistor R4 and resistor R5 to the zener diode CR4 and to ground. This is a 20 volt regulated supply coupled through resistor R6 to the emitter of the transistor Q2. Resistor R4 connects through the resistor 24 of potentiometer 25 to ground. The slider 26 of this potentiometer is connected to the base of transistor Q2. Capacitor C1 and resistor R2 are connected as in the previous embodiment.

The operation of the circuit as so far described will next be elucidated. With the slider 26 of potentiometer 25 all the way up to B+ there is no voltage on transistor Q2 and it is turned off. A voltage on the junction of resistors R5 and R6 of 400 millivolts, in an exemplary form of the invention will turn the transistor Q2 off.

If the slider 26 of potentiometer 25 is moved down, the emitter voltage of transistor Q2 follows it drawing current through the collector and through capacitor C1 which is also connected to resistor R2 and is connected to terminal 30 of windings S3.

If the slider 26 is not all the way up, that is turned off, there is a positive voltage on the junction of the collector of transistor Q2 and capacitor C2 which through the connection to resistor R2, that is through R2 to winding S3 into the base of transistor Q1, transistor Q1 becomes biased forwardly, and it conducts. There is a voltage drop between terminals 21 and 20 inducing voltage into the secondary winding S3 between its terminals, terminal 30 becoming more positive, i.e., this winding can conduct to ground through resistor R2 and capacitor C1. That is, a pulse will pass which will charge capacitor C1 negative at the bottom, positive at the top with this capacitor i.e., its upper end being negative will turn off transistor Q1. The rate of discharge of capacitor C1 from negative bias back to ground and up to a few volts positive for example, determines the frequency of the pulses.

The resistance capacitance circuit C1 and R2 has a time constant with an exponential charge rate which produces a linear current in transistor Q2 so that the rate of pulsing can be fast, i.e., 2500 cycles or it can be turned off altogether.

The transformer T induces a field in the winding S3 which is 180 degrees out of phase and which turns off the transistor Q1. The capacitor charges, then coming up to a few volts positive. By controlling the rate of discharge of condenser C1 the frequency of pulsing is controlled.

INHIBIT SWITCH

This switch is designated at 34 and is connected directly across the capacitor C1. Its purpose is to stop pulsing from a remote point without creating a misfiring condition, that is for doing so with integrity, i.e., without adding or losing a pulse. When it is closed there is a short circuit across capacitor C1 and therefore there is insufficient polarity available at terminal 35 to control transistor Q1 for pulsing.

STEP SWITCH

This switch is designated at 36. Its purpose is to cause pulsing at the rate of one pulse at a time by operating the switch for each pulse or for causing pulsing at a predetermined slow rate for manually returning a controlled device to a given position as described in the foregoing.

Numeral 37 designates a potentiometer having a slide wire resistance 38 and a slider 39. The resistor 38 is in parallel with a condenser C2. Step switch 36 is connected between the network or parallel branches comprised by potentiometer 37 and condenser C2 and terminal 35 at the upper end of capacitor C1. When the step switch 36 is closed, a minimum of 28 volts, for example, is applied on the upper half of condenser C2. A very small amount of energy can be transferred from C2 to C1, that is about 1/100 of the energy is available for the transfer. Condenser C2 is connected to the upper half of C1 and this transfer of energy is sufficient to make C1 positive enough to turn on transistor Q1 which charges capacitor C1 with a negative pulse and this causes the system to pulse for one pulse, which may be one pulse per second for example, each time the step switch is closed, if it is closed once per second. It may be operated by hand from a remote point. Or the stepping switch 36 can be closed so as to cause the circuit to pulse at a slow rate, as desired, for a relatively small number of pulses for the purposes as explained in the foregoing.

From the foregoing those skilled in the art will observe that the invention as described herein achieves and realizes all of the objects and advantages as outlined in the foregoing as well as having many additional advantages that are apparent from the detailed description. The pulse sources provided are highly effective for their purpose; are simplified, positive in action and dependable. They are able to produce pulses of particular desired characteristics, especially as respects pulse amplitude and duration and pulsing rate. The pulse generator of the preferred form of the invention has the additional features of having simplified and positive means for inhibiting pulsing with integrity and for manually initiating individual pulses or a plurality of pulses at a desired slow rate for manual actuation or adjustment of a device being controlled.

The foregoing disclosure is representative of preferred forms of the invention and is to be interpreted in an illustrative rather than a limiting sense, the invention to be accorded the full scope of the claims appended hereto.

I claim:

1. A pulse source comprising a transformer having a primary winding, a source of voltage having one terminal connected to said primary winding, said transformer having a first secondary winding connected to an output circuit in which voltage pulses are induced, a first transistor having a control electrode and first and second current electrodes, said first current electrode being connected to the primary winding of said transformer and said second current electrode being connected to another terminal of said source of voltage, said transformer having another secondary winding having one end connected to said control electrode of said first transistor, capacitor means having one side connected to the other end of said another secondary winding to be charged by voltage induced in said another secondary winding, the other side of said capacitor being connnected to said another terminal, said capacitor functioning to turn said first transistor off whereby to interrupt the circuit through said primary winding, said capacitor means having a discharge circuit whereby the capacitor means discharges causing said first transistor to be again turned on to repeat the cycle of operation, pulses being induced in said first secondary winding upon collapse of the transformer fields, said discharge circuit comprising a second transistor having a control electrode and first and second current electrodes, a pair of voltage dividers between said terminals, a variable voltage selecting means on one of said dividers and connected to the control electrode of said second transistor, the other voltage divider having a constant voltage stabilizing means therein, one of said current electrodes of said second transistor being connected to the junction of said capacitor and said another secondary winding, the other current electrode of said second transistor being connected to the other of said voltage dividers whereby the capacitor has a linear discharge rate.

2. A pulse source as in claim 1 including a switch connected across said capacitor whereby when the said switch is closed said capacitor is rendered inoperative for pulsing the circuit without gaining or losing a pulse.

3. A pulse source as in claim 1 having circuit means including a step switch for controlling the voltage on said capacitor means whereby to cause the said circuit to pulse at a relatively low predetermined rate.

4. A pulse source as in claim 1 including an adjustable resistance capacitance network and switch means for connecting said network to said capacitor whereby to control the voltage at one side of said capacitor and to thereby control the rate of pulsing of the pulse source, whereby the said pulse source may be controlled to deliver individual pulses or may be made to pulse at a relatively low rate determined by the adjustment of said resistance capacitance network.

References Cited by the Examiner

UNITED STATES PATENTS

| | | | |
|---|---|---|---|
| 2,536,804 | 1/1951 | Goldberg et al. | 331—146 |
| 2,981,865 | 4/1961 | Fernbach | 331—112 |
| 3,038,128 | 6/1962 | Fischman et al. | 331—112 |
| 3,116,465 | 12/1963 | Baude | 331—112 |
| 3,185,939 | 5/1965 | Moss et al. | 331—112 |

FOREIGN PATENTS

| | | |
|---|---|---|
| 218,962 | 12/1958 | Australia. |
| 1,299,976 | 6/1962 | France. |
| 1,132,186 | 6/1962 | Germany. |

ROY LAKE, *Primary Examiner.*

J. KOMINSKI, *Assistant Examiner.*